C. R. ALLEN.
VEHICLE TOP SUPPORT.
APPLICATION FILED JAN. 22, 1915.
1,287,813.
Patented Dec. 17, 1918.
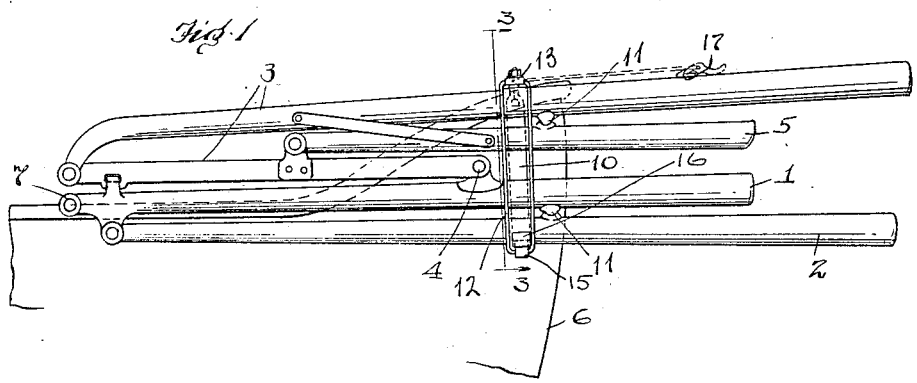
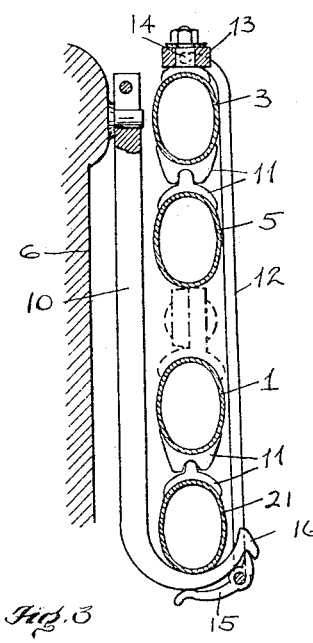
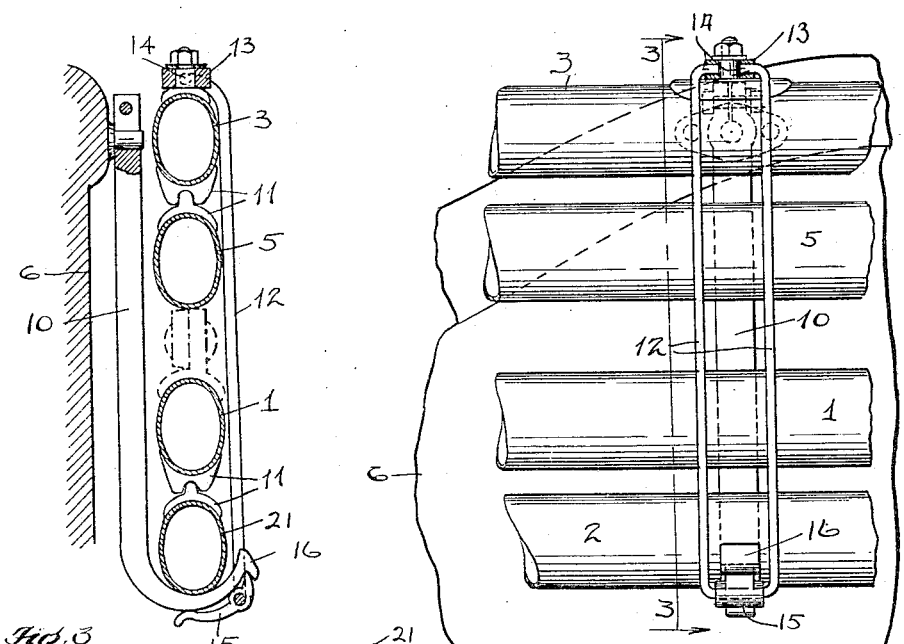
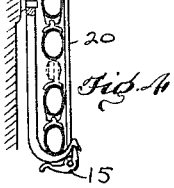
WITNESSES
O. M. Kappler
Thos H. Fay
INVENTOR
Charles R. Allen
BY
Fay & Oberlin
ATTORNEYS

UNITED STATES PATENT OFFICE.

CHARLES R. ALLEN, OF ASHTABULA, OHIO.

VEHICLE-TOP SUPPORT.

1,287,813.  Specification of Letters Patent.  Patented Dec. 17, 1918.

Application filed January 22, 1915. Serial No. 3,728.

*To all whom it may concern:*

Be it known that I, CHARLES R. ALLEN, a citizen of the United States, and a resident of Ashtabula, county of Ashtabula, and State of Ohio, have invented a new and useful Improvement in Vehicle-Top Supports, of which the following is a specification, the principle of the invention being herein explained and the best mode in which I have contemplated applying that principle, so as to distinguish it from other inventions.

The present improvements, relating as indicated to vehicle top supports, have regard more especially to the provision of suitable means for supporting such a top when in folded condition. Tops of the kind currently employed on automobiles comprise a plurality of bows which, when assembled and folded back of the rear seat of the vehicle, require either to be strapped down or in some other way secured to the vehicle body, in order to prevent them from being thrown about or racked by the jolts to which the vehicle is subject when in motion. The object of the invention is to provide a simple and inexpensive device for clamping or securing the bows together, and at the same time attaching them to the body at a point removed from the point of their pivotal attachment to the latter. To the accomplishment of the foregoing and related ends the invention, then, consists of the means hereinafter fully described and particularly pointed out in the claim.

The annexed drawing and the following description set forth in detail certain mechanism embodying the invention, such disclosed means constituting, however, but one of various mechanical forms in which the principle of the invention may be used.

In said annexed drawing:—

Figure 1 is a side elevational view of a vehicle top in folded condition with my improved supporting device applied thereto; Fig. 2 is a similar broken side elevation showing a portion of such top with the device in question on an enlarged scale; Fig. 3 is a transverse section of the same taken on the plane indicated by the line 3—3, Figs. 1 and 2; and Fig. 4 illustrates a modified form of the device.

The particular construction of top involved is a matter of indifference, since a supporting or securing device of the kind in hand may be used either with the sort of top required for a single seated vehicle and comprising but two main bows, or with the sort of top employed on a double seated vehicle and comprising two sets of main bows of at least two each, or else one set of such main bows with an articulated auxiliary bow, as in most types of so-called "one man tops". The particular top illustrated in Fig. 1 is of the latter type, comprising two main bows 1 and 2 and an articulated auxiliary bow 3 having its rear portion pivotally secured to the forward of said main bows at 4. Pivotally attached to such rear portion in turn is a supplemental bow 5, so that four bows altogether are folded down one upon the other when the top is collapsed or folded back. The main bow 1, which serves, in effect to support the others, is itself pivotally attached to the vehicle body 6 at the lower end 7 of said bow.

The present device comprises as one main element a bracket 10, preferably fixedly attached to the vehicle body at a point near its rear end, or at least removed a substantial distance from such point 7 of pivotal attachment of the main bow 2 to such body. This bracket is formed to receive the rear main bow 2 when folded back in the condition under consideration, and the other bows rest upon such rear main bow and each other in succession, as indicated best in Fig. 3. Suitable separating devices 11, as shown in the said figure, are desirably provided on the adjoining faces of the bows so as to hold them in vertical alinement and prevent them from rubbing against each other.

The other principal element of the supporting device of present interest comprises a link 12 preferably fashioned of a loop of more or less flexible wire that is secured to the topmost of the assembled bows, namely to bow 3, by means of a swivel block, 13, said link being itself pivotally attached to this block about an axis 14 at right angles to the pivotal axis of the block itself. On the other end of the loop or link is pivotally attached a latch or lever 15, which, in the position of the link shown in Figs. 2 and 3, is adapted to engage with its short end in a recess behind the hooked or recurved lower end 16 of the bracket 10 and to interlock therewith upon being forced back in contact with such bracket. This result is secured by having the axis, about which such lever is pivotally attached to the link, lie inside of the fulcrum point about which the lever itself swings when it is thus engaged with the bracket, as will be readily understood.

The link, or the end of the bracket, or both parts together, will possess sufficient resilience, or give, to permit of the lever to be thus swung into its locked position, and the link will then be under sufficient tension to secure the bows against undesired relative movement.

When the top is to be raised the link is secured alongside of, that is parallel with, the forward bow 3, to which it is attached through the medium of the swivel block 13, in any suitable way, but most conveniently by simply providing a hooked lug 17 on such bow, removed a proper distance from block 13 to permit of the lever being engaged therewith in just the same way that it engaged with the hooked lower end 16 of the bracket 10. The position of the link and lever, when the latter is thus engaged with the lug on the bow, is indicated in dotted outline in Fig. 2. When thus secured alongside the bow, the link will be hidden behind the side portion of the top covering, and so not only be out of the way, but out of sight as well.

The modified construction of the device illustrated in Fig. 4, differs from that first described only in that the link 20, corresponding with link 12, is detachably connected with the upper bow 3 by being simply looped over a stud 21 on the latter. When not in use, this form of link is stowed away in the tool box, or elsewhere out of the way. From the foregoing description of the construction of my improved top-supporting device, in either of the two illustrated forms, it will be seen that the two principal parts of said device are directly attached to the top and body of the vehicle, respectively, and that they are brought into position to coöperate by simply folding the top back into the position in which it is to be secured. A very simple movement of the lever there serves to either attach it to or detach it from the lug on the bow, or similarly attach it to or detach it from the lower hooked end of the bracket. Obviously the number of parts is reduced to a minimum, and the structure rendered correspondingly simple and inexpensive to manufacture, while the convenience of its manipulation far exceeds that of the ordinary strap as well as that of the relatively complicated clamps which have heretofore been proposed as substitutes for such strap.

Other modes of applying the principle of my invention may be employed instead of the one explained, change being made as regards the mechanism herein disclosed, provided the means stated by the following claim or the equivalent of such stated means be employed.

I therefore particularly point out and distinctly claim as my invention:—

In a device of the character described, the combination with a bracket adapted to receive and support the top of a vehicle in folded condition; of a block swiveled on the front of the upper bow of such top about an axis at right angles thereto; a link composed of a loop of slightly resilient wire, pivotally attached at one end to said block about an axis parallel with that of such bow; a latch in the form of a lever on the free end of such link adapted to draw such bow toward the latter; the resiliency of said link being sufficient to allow the latch to be closed; and a lug on such bow adapted to be similarly engaged by said latch whereby said link may be tightly secured along such bow.

Signed by me this 11th day of January, 1915.

CHARLES R. ALLEN.

Attested by—
 FRANK W. WAGNER,
 R. H. PFAFF.

Copies of this patent may be obtained for five cents each, by addressing the "Commissioner of Patents, Washington, D. C."